United States Patent Office 2,744,071
Patented May 1, 1956

2,744,071

LUBRICATING OIL ADDITIVES

William C. Hollyday, Jr., Fanwood, N. J., assignor to Esso Research and Engineering Company, a corporation of Delaware No Drawing. Application February 27, 1952,
Serial No. 273,780

9 Claims. (Cl. 252—51.5)

This invention relates to lubricating oil additive compositions and to mineral oil blends of such additives. Particularly the invention relates to polyamides that are oil soluble and that modify the wax crystals which form at low temperatures.

The lubricating oil art is familiar with the concept of increasing the low temperature fluidity of mineral oils containing wax therein by incorporation of additive materials. These materials are known to the art as pour point depressants in that they reduce the temperature at which the lubricating oil loses its property of free flow due to entrainment in a wax crystalline structure. The instant invention is directed toward such pour point depressors.

It has been found and forms the object of this invention that a new type of pour point depressant may be formed by copolymerizing with a dibasic acid or anhydride a di-amine compound which in turn has been formed by reacting an amine with ethylenimine. So far as is known this is the first instance of the formation of these oil soluble polyamides.

It has been found that these materials when blended in lubricating oils in proportions ranging from 0.001% to about 5.0% by weight materially reduce the pour point of the composition. Although blends containing this range of additive material are successful it is preferred to use about 0.01% to 0.5% by weight of the oil soluble polyamides of this invention.

The diamines are prepared by reacting ethylenimine with a long chain primary aliphatic amine in accordance with the following equation:

I  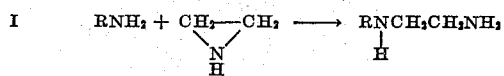

Temperatures within the range of 150° C. to 225° C. are required for this reaction and a range of 180° C. to 200° C. is preferred. The reaction may be carried out in the presence of a solvent such as o-dichlorobenzene, xylene, tetralin, decalin, etc.

A Friedel-Crafts catalyst such as aluminum chloride is desired. Although it is preferred to use about .80 mol of catalyst per mol of amine, an operable range of catalyst is 0.5 to 1.5 mols per mole of the amine used. The reaction takes from 10 to 60 minutes to complete and under normal circumstances will require from 10 to 30 minutes.

The major proportion of the oil solubility imparted to the resulting finished composition is obtained through the length of the R group, that is, the aliphatic portion of the primary amine. In the instant invention R is an aliphatic radical containing from 8 to 18 carbon atoms of either slightly branched or straight chain configuration, the latter being preferred. If desired, mixtures of various of the aliphatic amines may be employed. A series of aliphatic primary amines have recently become commercially available and are known to the trade as ARMEENS available through Armour & Company.

When the diamine has been formed it is further reacted with a dibasic acid or an anhydride of a dibasic acid. This reaction, known technically as "amidation," as distinguished from esterification, occurs in accordance with the following formula:

II

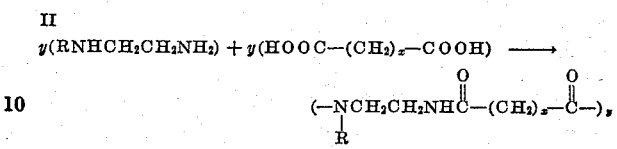

It is noted that one molecular amount of the amine is reacted with one mol of the dibasic acid or anhydride. The resulting polyamide will have a molecular weight from about 500 to 50,000 depending upon the time and temperature of the reaction. In the preferred embodiment of this invention a molecular weight of from 1,000 to 20,000 is most desirable. The reaction should be carried out at a temperature within a range from about 80° C. to 200° C., preferably 100°–150° C. The amidation reaction may be carired out in the presence of the solvent such as benzene, naphtha, toluene, xylene and the like. Ordinarily the reaction will continue for from 5 to 15 hours depending upon the starting materials used and will be continued, at any event, until substantially the theoretical amount of water is evolved.

In the dibasic acid formula given in Equation II, $x$ may be a number from 2 to 8, that is to say, the dibasic acid or anhydride will contain from about 4 to about 10 carbon atoms.

Operable dibasic acids include succinic, glutaric, adipic, pimelic, suberic, azelaic, sebacic, etc. Mixtures of the above acids may also be used.

The invention will be more clearly explained by reference to the following examples:

EXAMPLE 1

To a flask fitted with a stirrer, dropping funnel, thermometer and condenser were charged 250 ml. of o-dichlorobenzene and 26.6 g. (0.20 mole) of anhydrous aluminum chloride. The mixture was stirred to partially dissolve the aluminum chloride. To this mixture was then added portion-wise 50 g. (0.25 mole) of a mixture of primary aliphatic amines ranging from $C_8$ to $C_{18}$ in composition and having an average molecular weight of 200. The aluminum chloride went into solution completely.

The resultant solution was heated to reflux (170°–175° C.) and 10.8 g. (0.25 mole) of ethylenimine was added drop-wise over 15 minutes. Reflux was maintained for about 45 minutes. At the end of this time the reaction mixture was cooled and thoroughly washed with 25% sodium hydroxide solution. The o-dichlorobenzene layer contained the alkyl substituted ethylene diamine.

The o-dichlorobenzene solution of alkyl ethylene diamine was diluted with 300 ml. of benzene and transferred to a flask fitted with a stirrer, thermometer and separator for removing water from the condensed overhead. Exactly 6.0 g. (0.05 mole) of succinic acid, 14.6 g. (0.10 mole) of adipic acid and 10.0 g. (0.05 mole) of sebacic acid were added. The mixture was heated gently until the acids went into solution, and then refluxed for 15 hours. During this time about 6 ml. (0.33 mole) of water collected and it is thought some water was probably lost along with benzene vapors.

At the end of this time the solvents were removed from the product by distillation and by blowing with nitrogen. The residue was a viscous, brown, waxy material, weight 82 g. This product was tested as a pour depressant in a Mid-Continent SAE 20 grade oil with the results given in Table I.

EXAMPLE 2

This was similar to Example 1 except hexadecyl amine was used in place of the mixture of amines, and sebacic was used in place of the mixture of dibasic acids.

EXAMPLE 3

This was similar to Example 2 except the molar ratio of ethylenimine to hexadecyl amine was 1.25 instead of 1.00.

EXAMPLES 4 TO 7

These were similar to Example 1 except for the reactants used as noted in Table I.

Results obtained upon testing these materials as pour depressants are given in Table I.

*Table I*

POLYAMIDES AS OIL ADDITIVES

[Pour depressant action]

| Example No. | Polyamide from Ethylenimine and— | | ASTM Pour Point, °F. at Wt. Percent Indicated [1] | | | |
|---|---|---|---|---|---|---|
| | Amine | Dibasic Acid | .02 | .05 | .10 | .25 |
| 1 | $C_8$ to $C_{18}$ | $C_4$ to $C_{10}$ | −5 | −5 | −10 | −10 |
| 2 | $C_{16}$ | $C_{10}$ | −15 | −15 | −20 | <−35 |
| 3 | $C_{16}$ | $C_{10}$ | 0 | 0 | −20 | −25 |
| 4 | $C_{14}$ | $C_4$ | −5 | −15 | −15 | −20 |
| 5 | $C_{16}$ | $C_6$ | −5 | −10 | −10 | −15 |
| 6 | $C_{18}$ | $C_{10}$ | −10 | −10 | −10 | −15 |
| 7 | $C_{14}$ to $C_{18}$ | $C_4$ to $C_{10}$ | −5 | −5 | −10 | −15 |

[1] Test oil: a conventionally refined Mid-Continent SAE 20 grade, pour point +10° F.

To summarize briefly this invention relates to pour point depressants for mineral lubricating oil which are formed by amidating a dibasic acid or its anhydride with a reaction product of ethylenimine and a primary amine. The dibasic acid for best results will contain from 4 to 10 carbon atoms and the aliphatic amine will contain from 8 to 18 carbon atoms per molecule. The materials are blended in lubricating oils in amounts from 0.005% to 5% by weight based on the weight of the total composition.

What is claimed is:

1. A lubricating oil composition having outstanding low temperature properties which comprises a major portion of a mineral lubricating oil and a pour point depressing amount of a polyamide, of sufficient molecular weight to be oil soluble, of substantially equimolecular amounts of an amine constituent, selected from the group consisting of diamines having the general formula:

$$\text{R}-\underset{\underset{\text{H}}{|}}{\text{N}}\text{CH}_2\text{CH}_2\text{NH}_2$$

wherein R is an alkyl group containing from about 8 to 18 carbon atoms, and mixtures thereof, and an acid constituent selected from the group consisting of dibasic acids having the formula: $HOOC-(CH_2)_xCOOH$ wherein $x$ is an integer from about 2 to 8, their anhydrides and mixtures thereof.

2. A lubricating oil composition according to claim 1, wherein said polyamide has a molecular weight of about 500 to 50,000.

3. A lubricating oil composition according to claim 1, wherein said polyamide has a molecular weight of about 1,000 to 20,000.

4. A lubricating oil composition according to claim 1, wherein said amine constituent is a mixture of diamines in which R is an alkyl group containing from about 8 to 18 carbon atoms, and said acid constituent is a mixture of dibasic acids wherein $x$ of the formula is from about 2 to 8.

5. A lubricating oil composition according to claim 1, wherein R is an alkyl group containing 16 carbon atoms and said acid constituent is sebacic acid.

6. A lubricating oil composition according to claim 1, wherein R is an alkyl group containing 14 carbon atoms and said acid constituent is succinic acid.

7. A lubricating oil composition according to claim 1, wherein R is an alkyl group containing 16 carbon atoms and said acid constituent is adipic acid.

8. A lubricating oil composition according to claim 1, wherein R is an alkyl group containing 18 carbon atoms and said acid constituent is sebacic acid.

9. A lubricating oil composition according to claim 1, wherein said amine constituent is a mixture of diamines in which R is an alkyl group containing from about 14 to 18 carbon atoms and said acid constituent is a mixture of dibasic acids wherein $x$ of the formula is from about 4 to 10.

References Cited in the file of this patent

UNITED STATES PATENTS

| | | |
|---|---|---|
| 2,293,388 | Hanford | Aug. 18, 1942 |
| 2,388,035 | Frosch | Oct. 30, 1945 |
| 2,435,631 | Lieber | Feb. 10, 1948 |
| 2,594,286 | Bryant et al. | Apr. 29, 1952 |
| 2,604,451 | Rocchini | July 22, 1952 |